(12) United States Patent
Braunstorfinger et al.

(10) Patent No.: US 12,379,921 B2
(45) Date of Patent: Aug. 5, 2025

(54) MEASUREMENT APPLICATION MANAGEMENT DEVICE, MEASUREMENT APPLICATION DEVICE, AND DATA SOURCE

(71) Applicant: Rohde & Schwarz GmbH & Co. KG, Munich (DE)

(72) Inventors: Thomas Braunstorfinger, Munich (DE); Stefan Weth, Markt Schwaben (DE); Björn Schmid, Munich (DE); Bernhard Sterzbach, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 190 days.

(21) Appl. No.: 18/185,114

(22) Filed: Mar. 16, 2023

(65) Prior Publication Data
US 2024/0311142 A1 Sep. 19, 2024

(51) Int. Cl.
*G06F 15/16* (2006.01)
*G06F 8/60* (2018.01)
*G06F 8/61* (2018.01)
*G06F 8/70* (2018.01)

(52) U.S. Cl.
CPC ............. *G06F 8/70* (2013.01); *G06F 8/60* (2013.01); *G06F 8/61* (2013.01)

(58) Field of Classification Search
CPC ..... G06F 8/70; G06F 8/60; G06F 8/61; G06F 8/36; G06F 21/1011
See application file for complete search history.

(56) References Cited

U.S. PATENT DOCUMENTS

| | | |
|---|---|---|
| 7,987,449 B1 | 7/2011 | Marolia et al. |
| 11,010,284 B1 * | 5/2021 | Santiago ............... G06N 20/00 |
| 2002/0046233 A1 | 4/2002 | Ganzert |

(Continued)

FOREIGN PATENT DOCUMENTS

EP 1296312 A1 3/2003

OTHER PUBLICATIONS

European Patent Office, Partial European Search Report for European Patent Application No. 24153939.4, dated Jul. 25, 2024.
(Continued)

*Primary Examiner* — S. Sough
*Assistant Examiner* — Mohammad H Kabir
(74) *Attorney, Agent, or Firm* — Patterson + Sheridan, LLP

(57) ABSTRACT

The present disclosure provides a measurement application management device comprising a communication interface configured to communicatively couple the measurement application management device to a data source that provides program packages for a measurement application device that is managed by the measurement application management device, a measurement application device identification controller configured to identify the measurement application device, a program package retrieval controller configured to retrieve a list of program packages for the identified measurement application device, and a download controller configured to download at least one of the program packages to the identified measurement application device. Further, the present disclosure provides a respective measurement application device, and a respective data source.

21 Claims, 12 Drawing Sheets

(56) References Cited

U.S. PATENT DOCUMENTS

| | | | |
|---|---|---|---|
| 2002/0078142 A1* | 6/2002 | Moore | G06F 8/658 |
| | | | 709/217 |
| 2002/0188934 A1 | 12/2002 | Griffioen et al. | |
| 2006/0069717 A1* | 3/2006 | Mamou | G16H 40/20 |
| | | | 709/203 |
| 2007/0043548 A1* | 2/2007 | Arevalo | G06F 30/33 |
| | | | 703/14 |
| 2015/0058834 A1 | 2/2015 | Chan | |
| 2016/0179955 A1* | 6/2016 | Delli Santi | G06F 16/951 |
| | | | 707/709 |
| 2020/0026587 A1* | 1/2020 | Gupta | G06F 9/455 |
| 2020/0382599 A1 | 12/2020 | Knafel et al. | |
| 2023/0310938 A1* | 10/2023 | Baker | G09B 19/0038 |
| | | | 482/8 |

OTHER PUBLICATIONS

European Patent Office, Extended European Search Report for European Patent Application No. 24153939.4, dated Dec. 6, 2024.

* cited by examiner

MEASUREMENT APPLICATION MANAGEMENT DEVICE, MEASUREMENT APPLICATION DEVICE, AND DATA SOURCE

TECHNICAL FIELD

The disclosure relates to measurement application management device. Further, the disclosure relates to a measurement application device, and a data source.

BACKGROUND

Although applicable to any type of measurement application device, the present disclosure will mainly be described in conjunction with measurement application devices like oscilloscopes or vector network analyzers.

Modern measurement application devices in addition to the measurement hardware usually comprise powerful processors that allow performing a plurality of data processing functions on measured data.

However, a manufacturer of a measurement application device may in cases not predict the type of measurement applications or functions, or data processing functions a user may require.

Accordingly, there is a need for improving the flexibility of measurement application devices.

SUMMARY

The above stated problem is solved by the features of the independent claims. It is understood, that independent claims of a claim category may be formed in analogy to the dependent claims of another claim category.

Accordingly, it is provided:

A measurement application management device comprising a communication interface configured to communicatively couple the measurement application management device to a data source that provides program packages for a measurement application device that is managed by the measurement application management device, a measurement application device identification controller configured to identify the measurement application device, a program package retrieval controller configured to retrieve a list of program packages for the identified measurement application device, and a download controller configured to download at least one of the program packages to the identified measurement application device.

Further, it is provided:

A measurement application device comprising a measurement application management device comprising a communication interface configured to communicatively couple the measurement application management device to a data source that provides program packages for the measurement application device that is managed by the measurement application management device, a measurement application device identification controller configured to identify the measurement application device, a program package retrieval controller configured to retrieve a list of program packages for the identified measurement application device, and a download controller configured to download at least one of the program packages to the identified measurement application device.

Further, it is provided:

A data source for providing program packages for at least one measurement application device, the data source comprising a communication interface configured to couple the data source to at least one measurement application management device, and a permission controller coupled to the communication interface and configured to identify a permission state for the at least one measurement application management device and provide at least one of program packages or a list of program packages for a measurement application device that is managed by the respective measurement application management device according to the identified permission state.

The present disclosure is based on the finding that providing measurement application devices with a fixed set of functionality limits the flexibility of the respective measurement application device, and, therefore, the applicability of the measurement application device in respective measurement tasks or setups.

Consequently, the present disclosure provides a measurement application device, and a respective measurement application management device, together with a respective data source that allow flexibly updating the measurement application device.

A measurement application device may comprise any device that may be used in a measurement application to acquire an input signal or to generate an output signal, or to perform additional or supporting functions in a measurement application. A measurement application, also called measurement setup, may e.g., comprise at least one or multiple different measurement application devices for performing electric, magnetic, or electromagnetic measurements, especially on single devices under test. Such electric, magnetic, or electromagnetic measurements may be performed in a measurement laboratory or in a production facility in the respective production line. A measurement application or measurement setup may serve to qualify the single devices under test i.e., to determine the proper electrical operation of the respective devices under test.

Measurement application devices to this end may comprise at least one signal acquisition section for acquiring electric, magnetic, or electromagnetic signals to be measured from a device under test, or at least one signal generation section for generating electric, magnetic, or electromagnetic signals that may be provided to the device under test. Such a signal acquisition section may comprise, but is not limited to, a front-end for acquiring, filtering, and attenuating or amplifying electrical signals. The signal generation section may comprise, but is not limited to, respective signal generators, amplifiers, and filters.

Further, when acquiring signals, measurement application devices may comprise a signal processing section that may process the acquired signals. Processing may comprise converting the acquired signals from analog to digital signals, and any other type of digital signal processing, for example, converting signals from the time-domain into the frequency-domain.

The measurement application devices may also comprise a user interface to display the acquired signals to a user and allow a user to control the measurement application devices. Of course, a housing may be provided that comprises the elements of the measurement application device. It is understood, that further elements, like power supply circuitry, and communication interfaces may be provided.

A measurement application device may be a stand-alone device that may be operated without any further element in a measurement application to perform tests on a device under test. Of course, communication capabilities may also be provided for the measurement application device to interact with other measurement application devices.

A measurement application device may comprise, for example, a signal acquisition device e.g., an oscilloscope, especially a digital oscilloscope, a spectrum analyzer, or a vector network analyzer. Such a measurement application device may also comprise a signal generation device e.g., a signal generator, especially an arbitrary signal generator or a vector signal generator. Further possible measurement application devices comprise devices like calibration standards, or measurement probe tips.

Of course, at least some of the possible functions, like signal acquisition and signal generation, may be combined in a single measurement application device.

In embodiments, the measurement application device may comprise pure data acquisition devices that are capable of acquiring an input signal and of providing the acquired input signal as digital input signal to a respective data storage or application server. Such pure data acquisition devices not necessarily comprise a user interface or display. Instead, such pure data acquisition devices may be controlled remotely e.g., via a respective data interface, like a network interface or a USB interface. The same applies to pure signal generation devices that may generate an output signal without comprising any user interface or configuration input elements. Instead, such signal generation devices may be operated remotely via a data connection.

Modern measurement application devices may implement a plurality of functions based on respective computer readable instructions that may be stored in a non-transitory computer readable memory in the respective measurement application device, and that may be executed by a processor or controller of the measurement application device. Such functions may comprise, but are not limited to, the above-mentioned conversion of signals from the time-domain into the frequency-domain, summing functions, and subtraction functions for multiple acquired signals, filtering functions and the like.

As explained above, providing a measurement application device with a fixed set of such functions may limit the applicability of the measurement application device. For example, new processing functions may be required to analyze signals of a device under test that are generated in the device under test according to a newly developed communication standard.

In order to allow a measurement application device to receive and use new program packages, the present disclosure provides the measurement application management device. A program package in the context of the present disclosure may also be called program, application, or app. The term program package in this regard refers to any form of computer readable instructions that together provide a desired function or functionality when executed by a processor or another processing element of a respective measurement application device. A program package in embodiments may provide new functionality that is not yet present in a respective measurement application device, or an update to a program package that is already present in the respective measurement application device. The program packages may not only refer to measurement functions or signal processing functions. Program packages may also comprise updated for an operating system or background services of the measurement application device.

The term computer readable instructions may comprise, but is not limited to, at least one of compiled computer readable instructions for execution by a processor or processing element, interpretable computer readable instructions, like Python or JavaScript instructions, that are interpreted by another program or function that is executed by the processor or processing element, and configuration instructions or parameters that may be loaded into a configurable logic element, like an FPGA, or a CPLD.

The measurement application management device serves for providing an update-capability to any measurement application device. To this end, the measurement application management device comprises a communication interface that may couple the measurement application management device to a respective data source. The data source may also comprise a respective communication interface. The measurement application management device may request a list of program packages, or program packages from the data source, which may provide such a list or the program packages.

In embodiments, the communication interface of the measurement application management device and the data source may comprise any kind of wired and wireless communication interfaces, like for example a network communication interface, especially an Ethernet, wireless LAN or WIFI interface, a USB interface, a Bluetooth interface, an NFC interface, a visible or non-visible light-based interface, especially an infrared interface.

Further, the measurement application management device and the data source may communicate via an intermediary network with each other, and such a network may comprise any type of network devices, like switches, hubs, routers, firewalls, and different types of network technologies.

The measurement application management device further comprises a measurement application device identification controller that may identify a respective measurement application device. The measurement application device identification controller may identify the measurement application device e.g., via the communication interface or another dedicated interface, especially, if the measurement application device identification controller is not provided as part of or comprised by the measurement application device.

Identifying a respective measurement application device may comprise at least one of, but is not limited to, identifying the type of measurement application device, and identifying an individual measurement application device. For example, an exact type code or model code of the measurement application device may be identified to identify the type of measurement application device, or a serial number may be used to identify an individual measurement application device. Other means for identifying a measurement application device may also be used by the measurement application device identification controller. For example, a digital signature or a digital certificate may be used to identify a measurement application device. A username and a password may also be used to identify a measurement application device. Such a username and password may be provided by a user via an input device of the measurement application device, and may also be stored in the measurement application device after being provided by the user for the first time.

After identifying the measurement application device, a program package retrieval controller may retrieve a list of program packages for the identified measurement application device i.e., program packages that may be provided to the measurement application device for execution by the measurement application device.

After retrieving the list of possible program packages, a download controller may download at least one of the program packages to the measurement application device.

In embodiments, at least one of the measurement application device identification controller, the program package retrieval controller, and the download controller may be provided as at least one of a dedicated processing element e.g., a processing unit, a microcontroller, a field programmable gate array, FPGA, a complex programmable logic device, CPLD, an application specific integrated circuit, ASIC, or the like. A respective program or configuration may be provided to implement the required functionality. At least one of the measurement application device identification controller, the program package retrieval controller, and the download controller may at least in part also be provided as a computer program product comprising computer readable instructions that may be executed by a processing element. In a further embodiment, at least one of the measurement application device identification controller, the program package retrieval controller, and the download controller may be provided as addition or additional function or method to the firmware or operating system of a processing element that is already present in the respective measurement application management device, measurement application device or data source as respective computer readable instructions. Such computer readable instructions may be stored in a memory that is coupled to or integrated into the processing element. The processing element may load the computer readable instructions from the memory and execute them.

In addition, it is understood, that any required supporting or additional hardware may be provided like e.g., a power supply circuitry and clock generation circuitry.

It is understood, that any feature described in the present disclosure by the respective steps that are performed, may be implemented in any one of the present controllers or processing elements or a dedicated controller, or processing element by respective computer readable instructions.

In embodiments, the measurement application management device may be provided as a dedicated device that may communication with the data source and the measurement application device via the communication interface, or any other adequate interface.

In other embodiments, the measurement application management device may be integrated into or may be provided as part of the measurement application device. In such embodiments, the communication interface of the measurement application management device may be implemented as a communication interface of the measurement application device, for example, as a network interface of the measurement application device.

In further embodiments, the measurement application management device may be integrated into the data source and may communicate with the measurement application device via a communication interface of the data source.

In further embodiments, the single controllers i.e., the measurement application device identification controller, the program package retrieval controller, and the download controller of the measurement application management device may be distributed between at least two of a dedicated device, a measurement application device, and a data source.

The data source comprises a communication interface, as already indicated above, and a permission controller coupled to the communication interface. The permission controller identifies a permission state for a measurement application management device that provides a respective request for a list of program packages to the data source, and provides at least one of program packages or a list of program packages for a measurement application device that is managed by the respective measurement application management device according to the identified permission state.

The term "permission state" in the context of the present disclosure refers to the respective measurement application management device or the respective measurement application device being awarded a specific set of access rights to program packages. The permission state reflects this set of access rights. In embodiments, the term permission state may be exchanged for the term access rights, and the permission controller may determine access rights to the program packages for the respective measurement application management device, or the respective measurement application device.

In the data source, the permission controller may track the access rights or the permission state for a plurality of measurement application management devices or measurement application devices. Tracking the access rights or the permission state may comprise verifying that a respective measurement application management device, or measurement application device may access a respective program package, and only including the respective program package in the list, if the respective measurement application management device, or measurement application device may access the respective program package.

Access to a respective program package may be granted based on at least one of, but is not limited to a type or model of the measurement application management device, or the measurement application device, a hardware configuration of the measurement application device, extension modules available in or attached to the measurement application device, a service level agreement present for the respective measurement application device, and a license agreement present for the respective measurement application device.

Access rights may also be determined on a time basis. For example, access rights to a program package may be provided for a test period. Such access rights may be further granted after the test period, if a user of the measurement application device agrees to acquire a respective license.

It is understood, that the measurement application management device, or the measurement application device may comprise a respective component that monitors the compliance of the execution of the program packages with the determined permission state or access rights. Such a component may be implemented analogously to the controllers of the measurement application management device. The above-provided explanations apply mutatis mutandis to such a component.

The data source may in embodiments be provided as a dedicated server that may be implemented as a single hardware device. The data source may also be implemented as a distributed system comprising a plurality of servers, optionally with a load balancer, that distributes the load over the servers. The data source may also be provided as a so-called cloud or cloud-server system that implements the data source via virtualization methods independently of the underlying hardware.

Further embodiments of the present disclosure are subject of the further dependent claims and of the following description, referring to the drawings.

In the following, the dependent claims referring directly or indirectly to claim 1 are described in more detail. For the avoidance of doubt, the features of the dependent claims relating to the measurement application management device can be combined in all variations with each other and the disclosure of the description is not limited to the claim dependencies as specified in the claim set. Further, the features of the other independent claims regarding the measurement application device and the data source may be combined with any of the features of the dependent claims relating to the measurement application management device in all variations.

In an embodiment, which can be combined with all other embodiments of the measurement application management device mentioned above or below, the program package retrieval controller may further be configured to retrieve additional information for the program packages, and the download controller may be configured to download the at least one retrieved program package to the identified measurement application device in accordance with the additional information.

In examples, the download controller may be informed by the additional information about incompatibilities with specific measurement application devices, or outdated software versions of the respective program package, or required version of an operating system or supporting libraries, or license requirements of a program package. The additional information may, therefore, indicate if a respective program package may be downloaded to a measurement application device or not. The download controller may, consequently, only download program packages to a measurement application device that may be downloaded to that specific measurement application device.

In another embodiment, which can be combined with all other embodiments of the measurement application management device mentioned above or below, the additional information may comprise at least one of a permission of use information, a hardware requirements information, a functional description of the respective program package, a resource allocation information, a license information, a pricing information, release notes for the respective program package, and keycodes for the respective program package.

The permission of use information may refer to information about a permission of the specific measurement application device to use a program package. Such a measurement application device may e.g., be registered in the data source with a respective license agreement that allows using specific program packages in the measurement application device.

The permission of use information may refer to information about a permission of a specific user of the measurement application device to use a program package. For example, multiple users may use a single measurement application device. Each one of the users may then be provided with an individual set of access rights or an individual permission status that allows the user to use specific program packages. In the measurement application device all relevant program packages may be stored, while single users may only be granted access to the allowed program packages after authenticating at the measurement application device.

In embodiments, the additional information may comprise a hardware requirements information. The hardware requirements information may, for example, identify hardware that is required to operate a respective software package. Such an identification may be provided e.g., as a list of compatible measurement application devices, or a list of components that a respective measurement application device requires to run a program package.

In embodiments, the additional information may comprise a software requirements information. The software requirements information may identify requirements regarding software that needs to be installed on the respective measurement application device in order to successfully run a program package. The requirements regarding the software may refer to an operating system and additional libraries or program packages and their respective versions that need to be installed in the measurement application device.

In embodiments, the additional information may comprise a functional description of the respective program package. The functional description may be a text-based description and may be shown to a user of the measurement application management device, or the measurement application device prior to downloading a program package to the measurement application device.

In embodiments, the additional information may comprise a resource allocation information. The resource allocation information may refer to at least one of, but is not limited to, processing resources, storage memory resources, and RAM memory resources. By providing the resource allocation information, the measurement application management device, or the measurement application device may determine if enough resources are available in the measurement application device prior to downloading a respective program package to the measurement application device. If a user requests to install a program package that requires more resources than available, the user may be informed accordingly. Further a suggestion may be provided to the user to remove other installed program packages.

In embodiments, the additional information may comprise a license information. The license information may refer to a license being acquired or owned by the user of a measurement application device. For example, specific program packages may require acquiring a license prior to using the respective program package.

In embodiments, the additional information may comprise a pricing information. The pricing information may be provided for a user to decide whether to acquire a license for the respective program package, if the program package requires a license.

In embodiments, the additional information may comprise release notes for the respective program package. The release notes for the respective program package may be a text-based description regarding the program package and changes to the version of the program package. Such release notes may be shown to a user prior to downloading a program package to a measurement application device.

In embodiments, the additional information may comprise keycodes for the respective program package. Keycodes may define keys or codes that may be provided by a user or via another keycode source to activate specific functionality of a program package. For example, a program package may be downloaded to a measurement application device together with respective keycodes. The function of the program package or at least specific parts of the function of the program package may, in embodiments, be provided to a user only after entering the respective keycode, and after the entered keycode is compared to the stored keycode.

In embodiments, the additional information may comprise suggestions for a user to install specific program packages. These suggestions may be generated by the data source based on the user behavior i.e., based on usage statistics of the respective measurement application device, and based on the program packages already installed in the measurement application device.

In embodiments, the additional information may comprise suggestions for a user to acquire specific additional accessories, like cables, mixers, measurement probes, and calibration devices. This suggestion may, especially, be provided based on usage statistics of the measurement application device.

In a further embodiment, which can be combined with all other embodiments of the measurement application management device mentioned above or below, the measurement application management device may comprise a user interface, wherein the download controller may be configured to download at least one of the program packages to the identified measurement application device after a user confirmation is received via the user interface.

The user interface allows interactively querying a user of the measurement application management device, or the measurement application device prior to downloading a program package to the measurement application device. For example, a user may be informed of the availability of an update for at least one of the program packages of a measurement application device, and the respective updates may only be installed after receiving respective instructions from the user. Further, information about newly available program packages may be provided to a user.

As indicated above, a plurality of types of additional information may be provided from the data source to the measurement application management device. In embodiments, the additional information, or at least part of the additional information may be shown to the user prior to asking for the confirmation from the user.

In an embodiment, which can be combined with all other embodiments of the measurement application management device mentioned above or below, the measurement application management device may further comprise a data storage configured to store the downloaded program packages.

The data storage may serve as a kind of intermediary storage for the program packages. The measurement application management device may, for example, download available program packages in bulk, especially during non-operating times of the measurement application device, like during the night. Downloading of the program packages to a measurement application device may then quickly be performed on request by a user without the need to download the program packages from a remote data source. In such an embodiment, the measurement application management device may be provided with a permission controller that performs the functionality of the permission controller in the data source prior to downloading a program package to the measurement application device.

In an embodiment, which can be combined with all other embodiments of the measurement application device or the measurement application management device mentioned above or below, the measurement application device or the measurement application management device may further comprise an access and identity management controller configured to at least one of provide a proof of identity of the identified measurement application device to the data source, and manage access of the identified measurement application device to the program packages based on an identity of the identified measurement application device.

In embodiments, the access and identity management controller may be provided as at least one of a dedicated processing element e.g., a processing unit, a microcontroller, a field programmable gate array, FPGA, a complex programmable logic device, CPLD, an application specific integrated circuit, ASIC, or the like. A respective program or configuration may be provided to implement the required functionality. The access and identity management controller may at least in part also be provided as a computer program product comprising computer readable instructions that may be executed by a processing element. In a further embodiment, the access and identity management controller may be provided as addition or additional function or method to the firmware or operating system of a processing element that is already present in the respective measurement application management device, or measurement application device as respective computer readable instructions. Such computer readable instructions may be stored in a memory that is coupled to or integrated into the processing element. The processing element may load the computer readable instructions from the memory and execute them.

In addition, it is understood, that any required supporting or additional hardware may be provided like e.g., a power supply circuitry and clock generation circuitry.

The proof of identity may be provided in any adequate form by the access and identity management controller, and may comprise at least one of, but is not limited to, a username and a password, a digital certificate, a digital signature, and credentials of a single-sign-on system.

In an embodiment, which can be combined with all other embodiments of the data source mentioned above or below, the data source may further comprise a device registration controller that is coupled to the communication interface and that is configured to receive a device registration application via the communication interface, and to verify the device registration application, and to output a device registration confirmation if the device registration application is verified successfully.

In embodiments, the measurement application device may be configured to operate in a limited mode until the measurement application device is registered with the data source.

The explanations provided above regarding the controllers of the measurement application management device, or the measurement application device apply mutatis mutandis to the device registration controller.

The device registration controller in the data source may, in embodiments, serve as counterpart to the access and identity management controller in the measurement application device, or the measurement application management device. A registration request provided to the device registration controller may comprise a respective proof of identity and may allow the device registration controller to identify a respective measurement application device. After registering the measurement application device, the device registration controller may send a respective registration confirmation to the measurement application management device, or the measurement application device e.g., for displaying to a user.

The registration may, in embodiments, be the basis for determining the above-mentioned additional information for a measurement application device. The registration of a measurement application device may, in embodiments, also serve to log information about a specific measurement application device in the data source. Such a log may serve e.g., to provide a list of measurement application devices and the installed program packages to an owner of the measurement application devices.

In another embodiment, which can be combined with all other embodiments of the data source mentioned above or below, the data source may further comprise at least one data storage configured to store the program packages. In embodiments, the data source may comprise at least one data storage for each one of at least two specific geographical regions.

As explained above, the data source may be implemented as a distributed system, or as a cloud-based system, or cloud system. In such embodiments, different data storages may be provided for serving different geographical regions of the world to improve the efficiency of the transmission of the program packages to the single measurement application devices.

In a further embodiment, which can be combined with all other embodiments of the data source mentioned above or below, the permission controller may further be configured to provide additional information to the measurement application management device via the communication interface. The additional information is described above with regard to the measurement application management device receiving the additional information. The above-provided explanations apply mutatis mutandis.

In an embodiment, which can be combined with all other embodiments of the data source mentioned above or below, the data source may further comprise a device simulator configured to simulate a measurement application device and to execute a program package in the simulated measurement application device.

The device simulator may be implemented as a respective program package that is executed by a controller or processor of the data source. The device simulator may comprise a developer interface that allows developers of program packages to execute and debug the respective program packages in the simulated measurement application device while developing a program package.

The device simulator may, consequently, simulate at least one or multiple measurement application devices with the program package under development being executed in the simulated one or multiple measurement application devices. The device simulator will return respective debugging information e.g., to a development environment of the developer of the program package.

The device simulator may comprise functions to simulate the full measurement application device(s) including input/output interfaces. The device simulator may also comprise functions to simulate a device under test.

In another embodiment, which can be combined with all other embodiments of the data source mentioned above or below the data source may further comprise a device interface coupled to the communication interface and configured to download a program package to a measurement application device via the communication interface and to control the measurement application device via the communication interface to execute the downloaded program package, and to collect feedback via the communication interface about the execution of the downloaded program package in the measurement application device.

The device interface may be provided at least in part as a respective program component or library that allows accessing and controlling a remote measurement application device via a respective interface. The device interface may be used as alternative to the device simulator, and may also serve to test and debug program packages that are under development, and to provide debug data or feedback during the execution of the program package.

With the device simulator, and the device interface the provider of the data source may provide developers that want to develop program packages with a simple tool to test the program packages, without the developers needing to own all possible measurement application devices.

In another embodiment, which can be combined with all other embodiments of the data source mentioned above or below, the data source may further comprise a device configuration memory coupled to the communication interface and configured to store device configuration data for at least one measurement application device that is received via the communication interface.

As indicated above with regard to the device registration controller, data about the single measurement application devices, or measurement application management devices may be stored in the data source. The device configuration memory may serve to store that information.

The device configuration memory may also store further information about the configuration of a measurement application device. The device configuration memory may in embodiments store all the information that is required to replicate the exact state of a measurement application device on another measurement application device. The measurement application devices may comprise the functionality to retrieve such a configuration and internally restore the state represented by the configuration.

BRIEF DESCRIPTION OF THE DRAWINGS

For a more complete understanding of the present disclosure and advantages thereof, reference is now made to the following description taken in conjunction with the accompanying drawings. The disclosure is explained in more detail below using exemplary embodiments which are specified in the schematic figures of the drawings, in which.

In the figures like reference signs denote like elements unless stated otherwise.

DETAILED DESCRIPTION OF THE DRAWINGS

Figure 1:
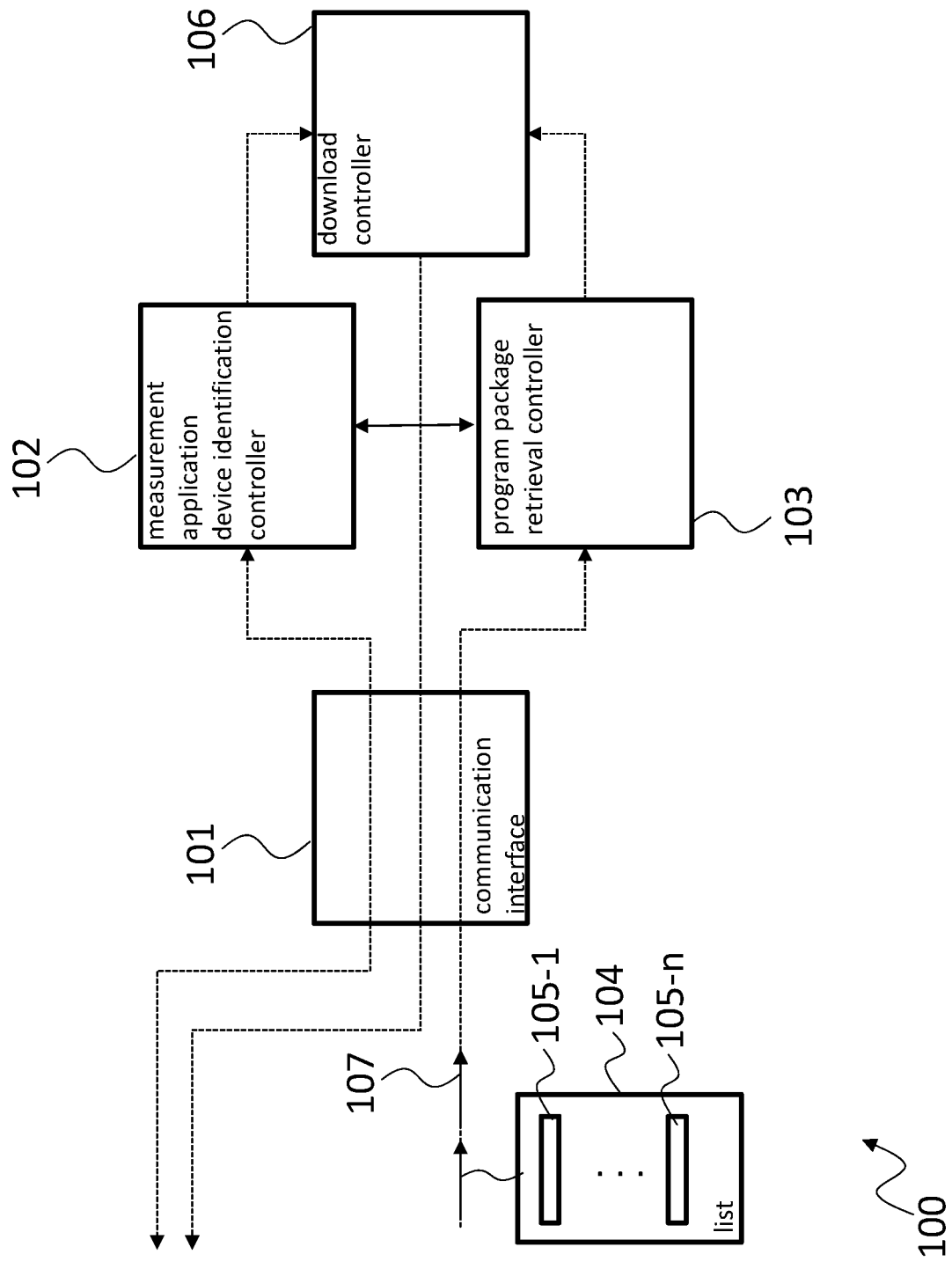
FIG. 1 shows a block diagram of an embodiment of a measurement application management device according to the present disclosure.

FIG. 1 shows a block diagram a measurement application management device 100. The measurement application management device 100 comprises a communication interface 101 that is coupled to a measurement application device identification controller 102, and a program package retrieval controller 103, and a download controller 106.

The identification controller 102 identifies a measurement application device that is managed by the measurement application management device 100. In embodiments, the measurement application management device 100 may be implemented as part of or in such a measurement application device, like shown e.g., in FIG. 5. The information about the identified measurement application device may then be provided either directly to a data source, or to the program package retrieval controller 103.

The program package retrieval controller 103 may then retrieve a list 104 of program packages 105-1-105-$n$ for the identified measurement application device, and provide this list to the download controller 106. The download controller 106 may then download at least one of the program packages 105-1-105-$n$ to the identified measurement application device.

Together with the list 104, the program package retrieval controller 103 may receive or retrieve additional information 107. The additional information 107 may comprise at least one of a permission of use information, a hardware requirements information, a software requirements information, a functional description of the respective program package, a resource allocation information, a license information, a pricing information, release notes for the respective program package, and keycodes for the respective program package.

In embodiments, the identification controller 102, and the program package retrieval controller 103, and the download controller 106 may be provided as computer implemented elements, for example, as computer programs or libraries, or as part of a single computer program or library that is executed by a controller or an operating system of the measurement application management device 100.

Figure 2:
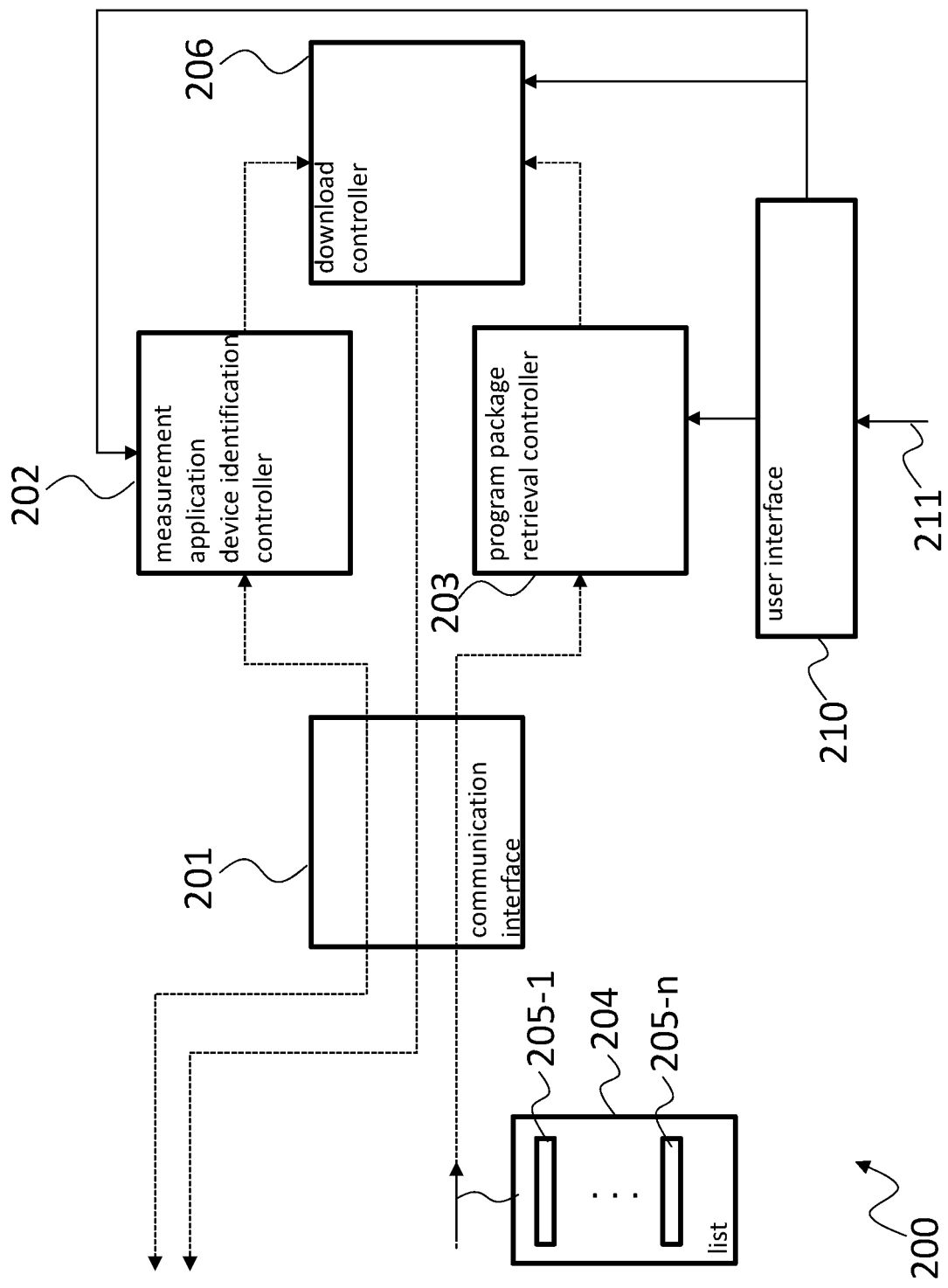
FIG. 2 shows a block diagram of another embodiment of a measurement application management device according to the present disclosure.

FIG. 2 shows a block diagram of another measurement application management device 200. The measurement application management device 200 is based on the measurement application management device 100. Therefore, the measurement application management device 200 comprises a communication interface 201 that is coupled to a measurement application device identification controller 202, and a program package retrieval controller 203, and a download controller 206. Further, the measurement application management device 200 comprises a user interface 210 for receiving a user input 211. The user interface 210 may be coupled to at least one of the measurement application device identification controller 202, the program package retrieval controller 203, and the download controller 206. If the measurement application device identification controller 202, the program package retrieval controller 203, and the download controller 206 are implemented as a single, as indicated above, the user interface 210 may be coupled to that element.

In embodiments, the user interface 210 may be hardware interface, like a screen with a keyboard, or a touchscreen. In other embodiments, the user interface 210 may be provided as a software-based interface, for example, as an interactive web-page that is displayed to a user via a web-browser on a user device.

Via the user interface 210 the user may control the operation of the measurement application management device 200 with respective user input 211. The user may, for example, initiate retrieval of the list 204, and downloading of one of the program packages 205-1-205-$n$ to the measurement application device.

If a user consent is required, for example, to purchase or license one of the program packages 205-1-205-$n$, the user may consent to the purchase via a respective user input 211.

Of course, if the measurement application management device 200 is implemented as part of or integrated into another device, for example, a measurement application device, the user interface 210 may be the user interface of that device.

Figure 3:
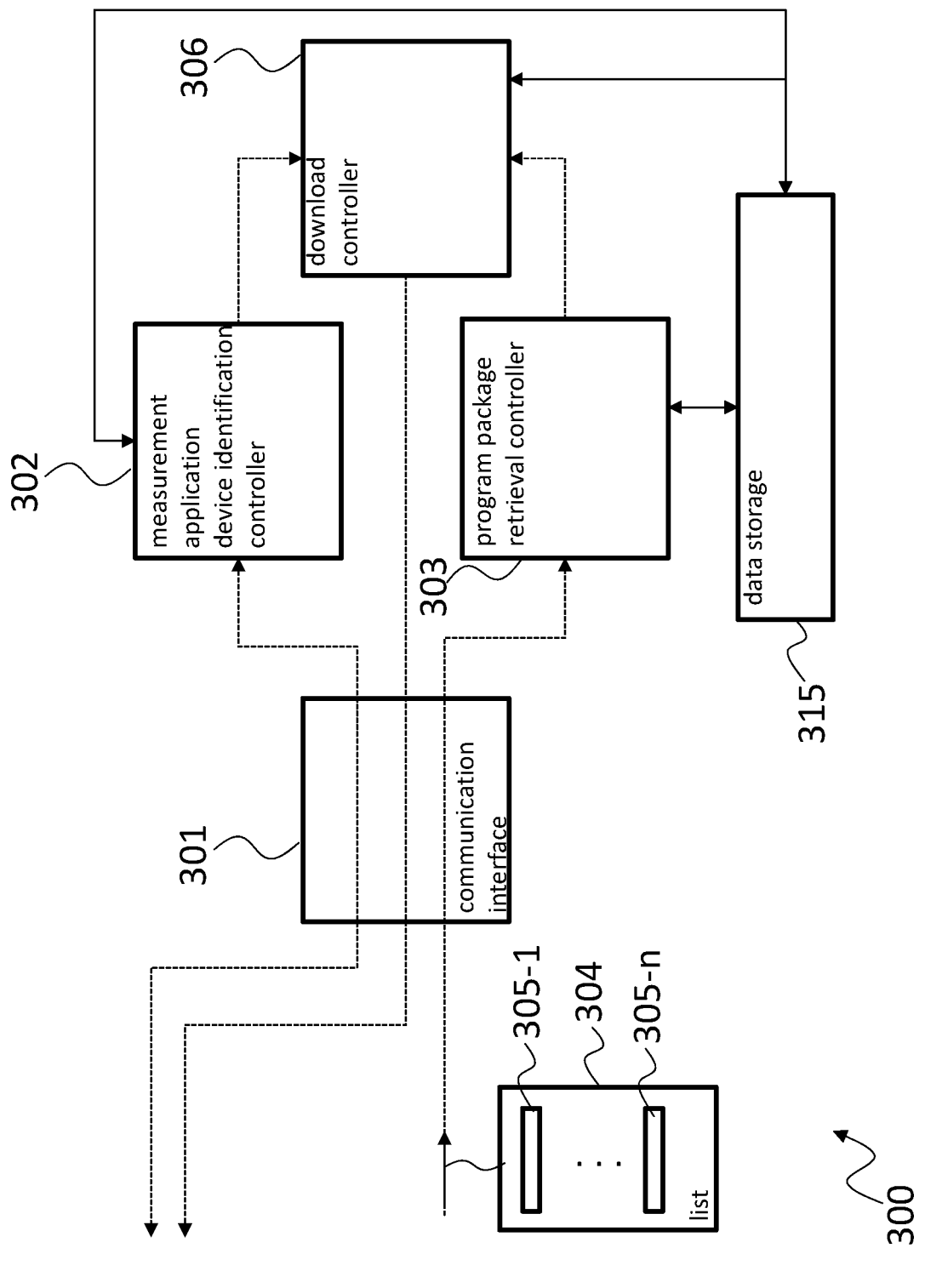
FIG. 3 shows a block diagram of another embodiment of a measurement application management device according to the present disclosure.

FIG. 3 shows a block diagram of a measurement application management device 300. The measurement application management device 300 is based on the measurement application management device 100. Therefore, the measurement application management device 300 comprises a communication interface 301 that is coupled to a measurement application device identification controller 302, and a program package retrieval controller 303, and a download controller 306. Further, the measurement application management device 300 comprises a data storage 315. The data storage 315 may store the downloaded program packages 305-1-305-$n$. This allows pre-loading the program packages 305-1-305-$n$ for quick installation on a measurement application device.

Figure 4:
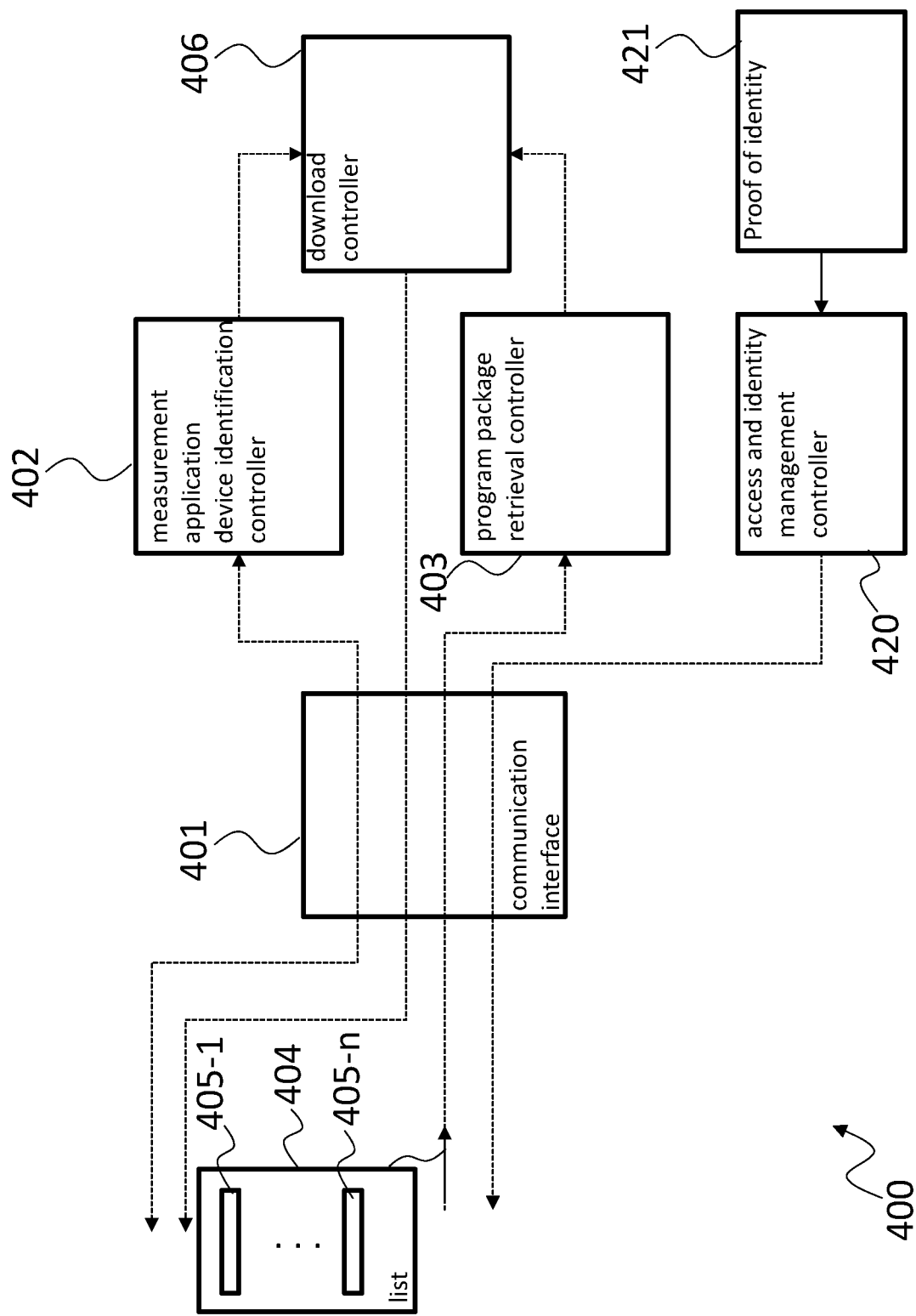
FIG. 4 shows a block diagram of another embodiment of a measurement application management device according to the present disclosure.

FIG. 4 shows a block diagram of a measurement application management device 400. The measurement application management device 400 is based on the measurement application management device 100. Therefore, the measurement application management device 400 comprises a communication interface 401 that is coupled to a measurement application device identification controller 402, and a program package retrieval controller 403, and a download controller 406. Further, the measurement application management device 400 comprises an access and identity management controller 420 that may provide a proof of identity 421 for a measurement application device to a data source.

The explanations provided regarding the identification controller 102, and the program package retrieval controller 103, and the download controller 106 being provided as computer implemented elements, for example, as computer programs or libraries, or as part of a single computer program or library that is executed by a controller or an operating system of the measurement application management device, also applies mutatis mutandis to the access and identity management controller 420.

It is understood, that elements of the measurement application management device 100, the measurement application management device 200, the measurement application management device 300, and the measurement application management device 400 may be freely combined to form new embodiments of a measurement application management device according to the present disclosure.

Figure 5:
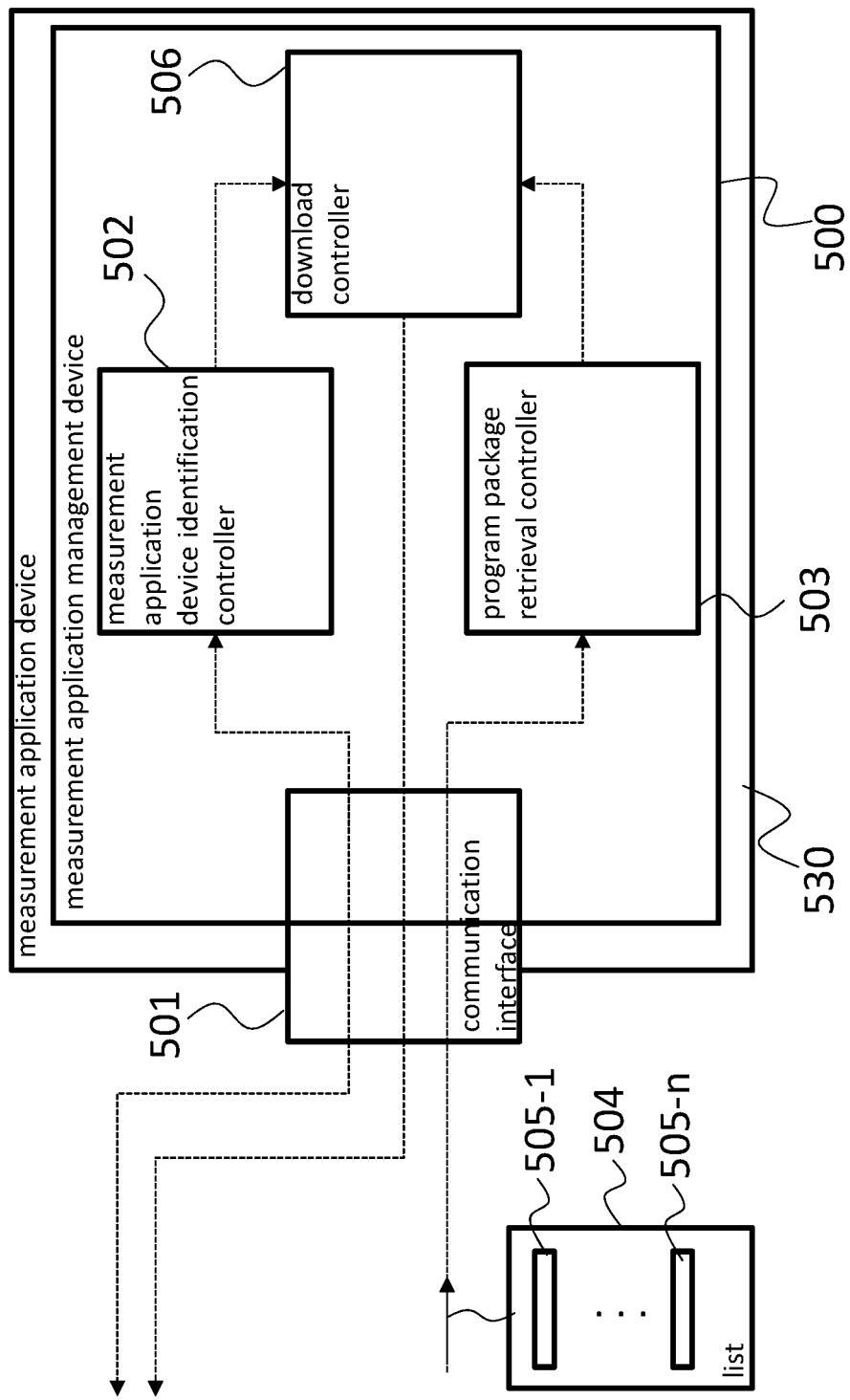
FIG. 5 shows a block diagram of an embodiment of a measurement application device according to the present disclosure.

FIG. 5 shows a block diagram of an embodiment of a measurement application device 530 that comprises a measurement application management device 500 according to FIG. 1. The measurement application management device 500 is based on the measurement application management device 100. Therefore, the measurement application management device 500 comprises a communication interface 501 that is coupled to a measurement application device identification controller 502, and a program package retrieval controller 503, and a download controller 506. The communication interface 501 is a communication interface 501 of the measurement application device 530.

Although not explicitly shown, the measurement application device 530 may comprise any other elements required to perform the function of the measurement application device 530. Such elements may comprise, but are not limited to, at least one of a measurement interface, a signal processor for processing measured signals, a display, and user input devices. Further examples of measurement application devices will be provided below.

It is understood, that the measurement application device 530 may comprise a measurement application management device according to any of the embodiments provided in this disclosure, or according to a combination of at least two of the embodiments provided in this disclosure.

In embodiments, the identification controller 502, and the program package retrieval controller 503, and the download controller 506 may be provided as computer implemented elements, for example, as computer programs or libraries, or as part of a single computer program or library that is executed by a controller or an operating system of the measurement application management device 500.

Figure 6:
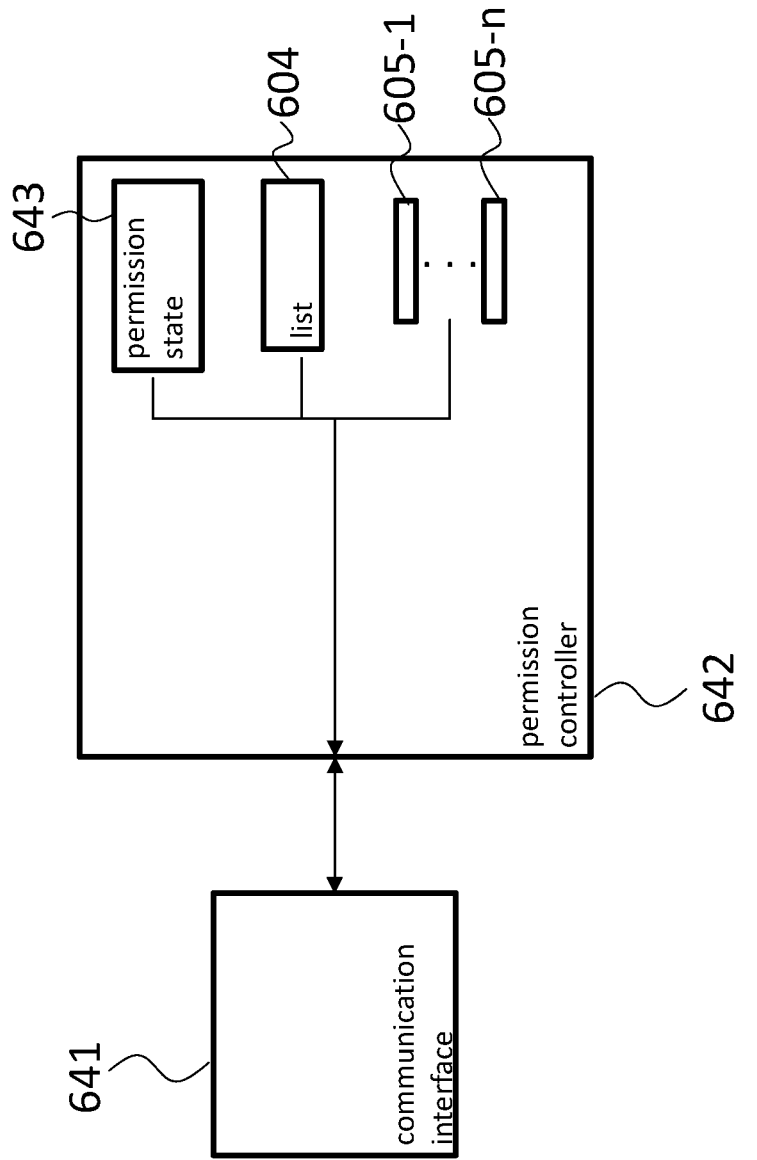
FIG. 6 shows a block diagram of an embodiment of a data source according to the present disclosure.

FIG. 6 shows a block diagram of a data source 640. The data source 640 comprises a communication interface 641 that is coupled to a permission controller 642.

The permission controller 642 identifies a permission state 643 for at least one measurement application management device after receiving a request to provide a list of program packages from a measurement application management device.

The permission controller 642 may then provide at least one of a list of program packages 605-1-605-*n* or the program packages for the measurement application device that is managed by the respective measurement application management device according to the identified permission state 643.

In embodiments, the permission controller 642 may handle the permission state 643 internally for one or multiple measurement application devices. In embodiments, the permission state 643 may also be provided from external sources or data storages. The same applies to the program packages 605-1-605-*n*, and the list 604.

Figure 7:
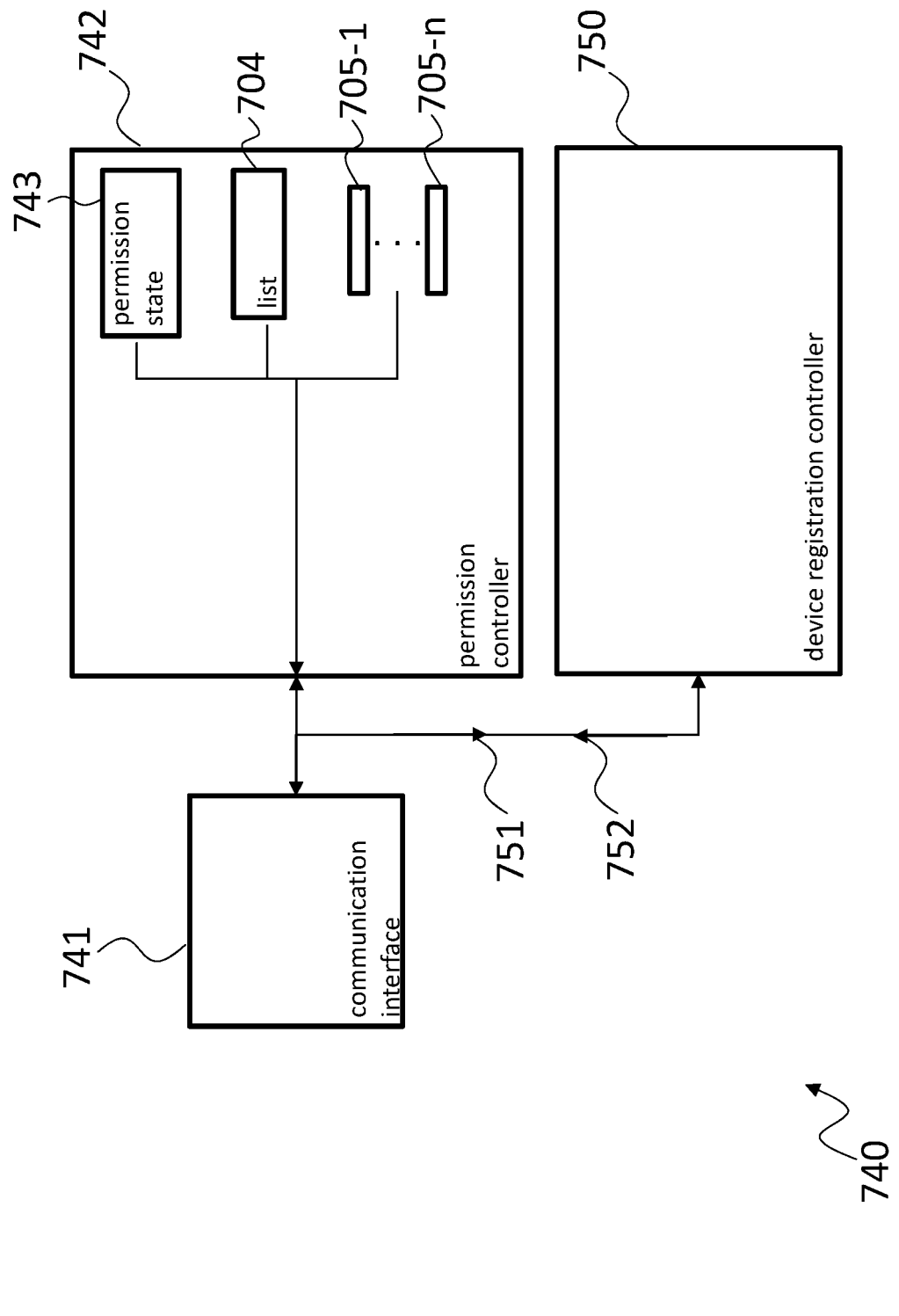
FIG. 7 shows a block diagram of another embodiment of a data source according to the present disclosure.

FIG. 7 shows a block diagram of a data source 740. The data source 740 is based on the data source 640. Therefore, the data source 740 comprises a communication interface 741 that is coupled to a permission controller 742. The data source 740 further comprises a device registration controller 750.

The device registration controller 750 may receive a device registration application 751 via the communication interface 741, and may verify the device registration application 751. If the device registration application 751 is verified successfully, the device registration controller 750 may output a device registration confirmation 752.

Figure 8:
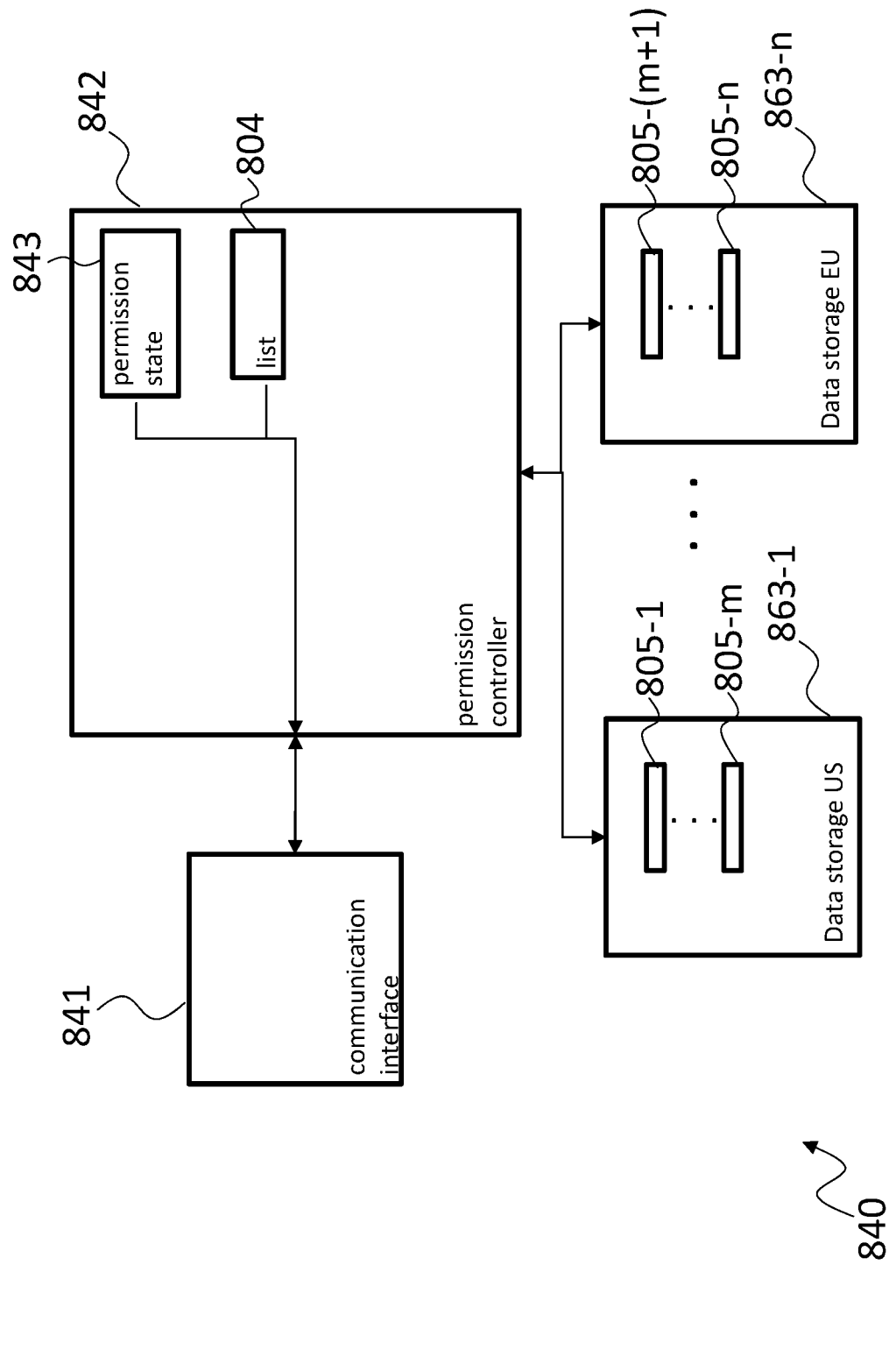
FIG. 8 shows a block diagram of another embodiment of a data source according to the present disclosure.

FIG. 8 shows a block diagram of a data source 840. The data source 840 is based on the data source 640. Therefore, the data source 840 comprises a communication interface 841 that is coupled to a permission controller 842. The data source 840 further comprises two data storages 863-1-863-*n*, wherein in other embodiments the data source 840 may comprise only one data storage or more than two data storages.

The data storage 863-1 is referred to as data storage US, while the data storage 863-*n* is depicted as data storage EU, in order to indicate that the data storages may serve different geographical regions of the world. Further, the data storages 863-1-863-*n* may each store a subset of the possible program packages 805-1-805-*n*.

In embodiments, the data source 840 may comprise a router that routes requests to the most adequate one of the data storages 863-1-863-*n*.

Figure 9:
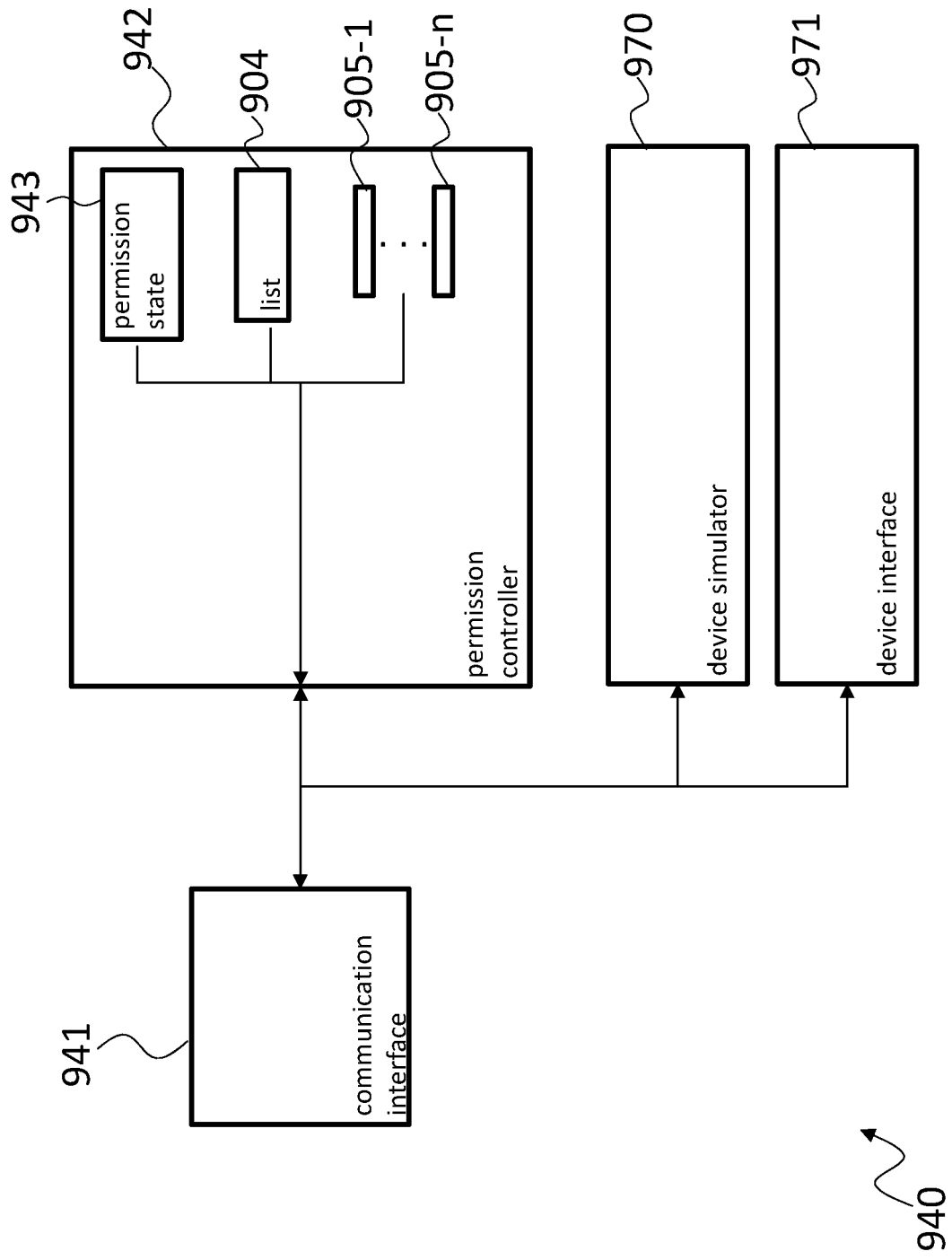
FIG. 9 shows a block diagram of another embodiment of a data source according to the present disclosure.

FIG. 9 shows a block diagram of a data source 940. The data source 940 is based on the data source 640. Therefore, the data source 940 comprises a communication interface 941 that is coupled to a permission controller 942. The data source 940 further comprises a device simulator 970, and a device interface 971. In embodiments, the data source 940 may comprise only one of the device simulator 970, and the device interface 971.

As explained above, the device simulator 970 may simulate a measurement application device and may execute one of the program packages 905-1-905-*n* in the simulated measurement application device. The device simulator 970 may provide information about the execution of the respective one of the program packages 905-1-905-*n* e.g., to a development environment of a developer that develops one of the program packages 905-1-905-*n*.

The device interface 971 may provide a similar functionality, but may couple the data source 940 to a real measurement application device and control the measurement application device to execute the program package 905-1-905-*n* for development and debugging purposes.

Figure 10:
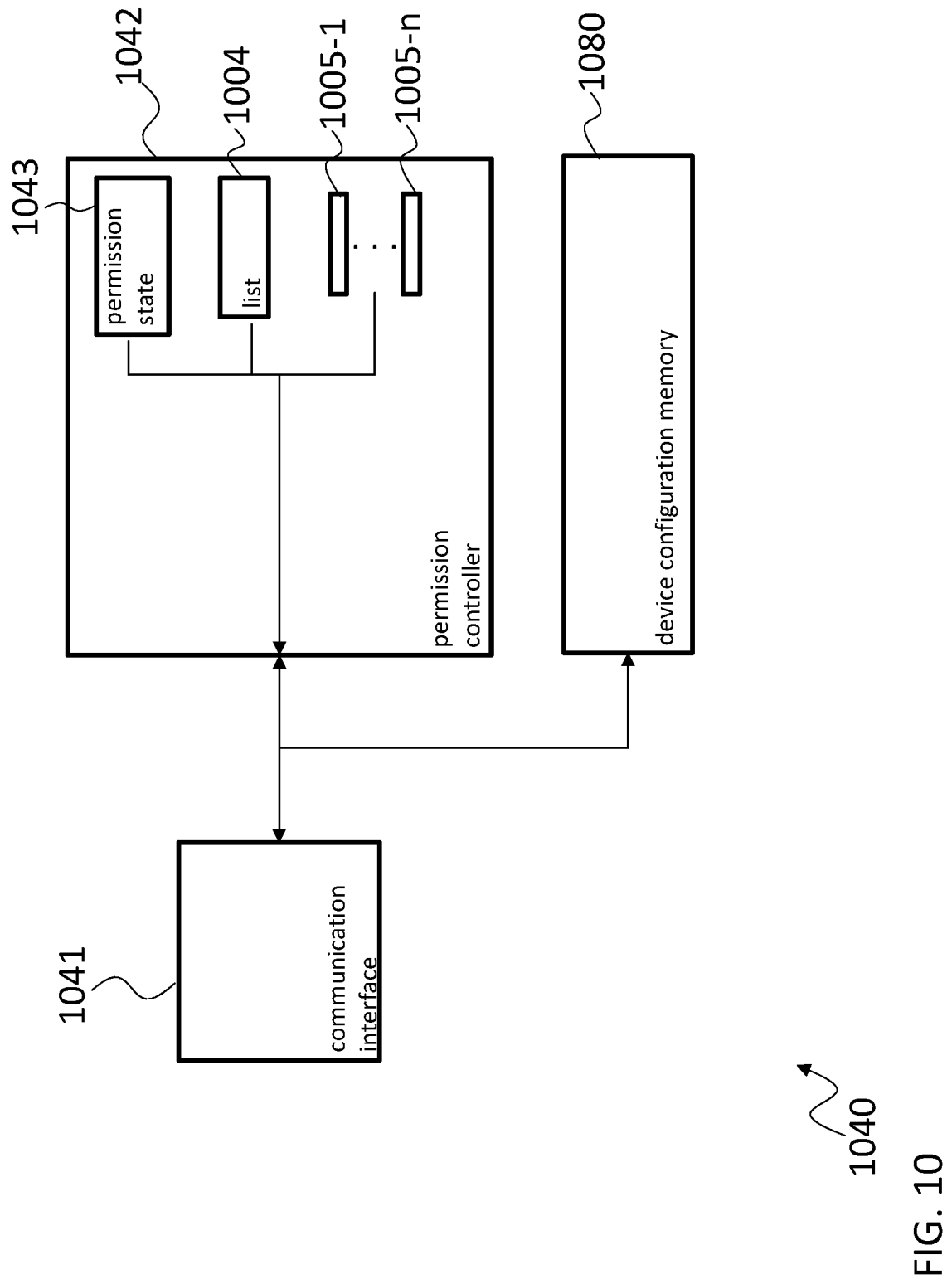
FIG. 10 shows a block diagram of another embodiment of a data source according to the present disclosure.

FIG. 10 shows a block diagram of a data source 1040. The data source 1040 is based on the data source 640. Therefore, the data source 1040 comprises a communication interface 1041 that is coupled to a permission controller 1042. The data source 1040 further comprises a device configuration memory 1080.

The device configuration memory 1080 stores device configuration data for at least one measurement application device that is received via the communication interface 1041. The device configuration memory 1080 may, for example, serve to store configuration data for at least one measurement application device that will then allow to restore the configuration on the measurement application device or any other identical measurement application device.

Figure 11:
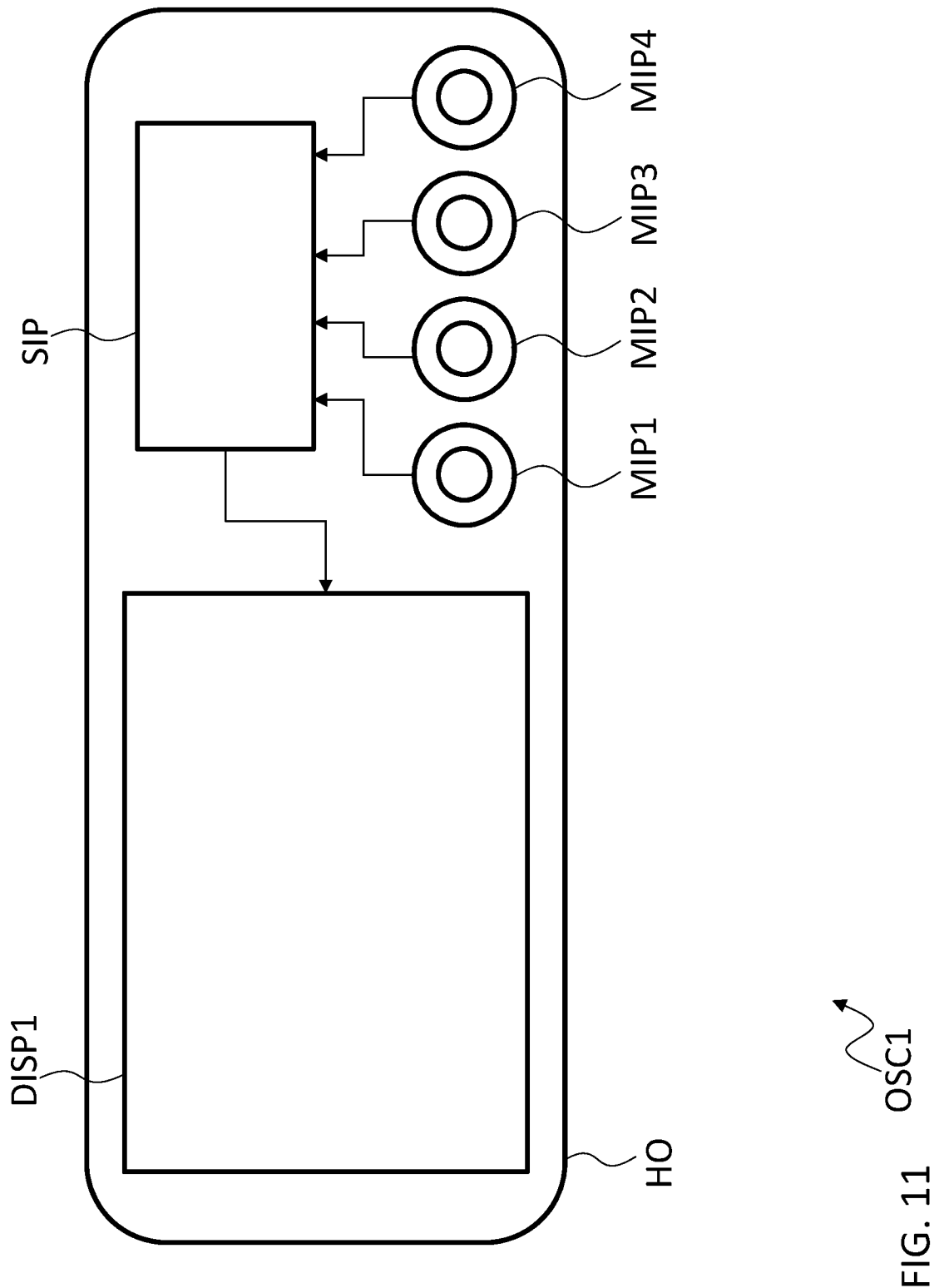
FIG. 11 shows a block diagram of an oscilloscope that may be used with an embodiment of a measurement application management device according to the present disclosure.

FIG. 11 shows a block diagram of an oscilloscope OSC1 that may be an embodiment of a measurement application device according to the present disclosure.

The oscilloscope OSC1 comprises a housing HO that accommodates four measurement inputs MIP1, MIP2, MIP3, MIP4 that are coupled to a signal processor SIP for processing any measured signals. The signal processor SIP is coupled to a display DISP1 for displaying the measured signals to a user.

Although not explicitly shown, it is understood, that the oscilloscope OSC1 may also comprise signal outputs that may also be coupled to the differential measurement probe. Such signal outputs may for example serve to output calibration signals. Such calibration signals allow calibrating the measurement setup prior to performing any measurement. The process of calibrating and correcting any measurement signals based on the calibration may also be called de-embedding and may comprise applying respective algorithms on the measured signals.

In the oscilloscope OSC1 the functionality of any of the elements of the measurement application management device or the measurement application device may be implemented in the signal processor SIP. It is understood, that a dedicated communication interface, like a network interface, may be added to the oscilloscope OSC1.

Figure 12:
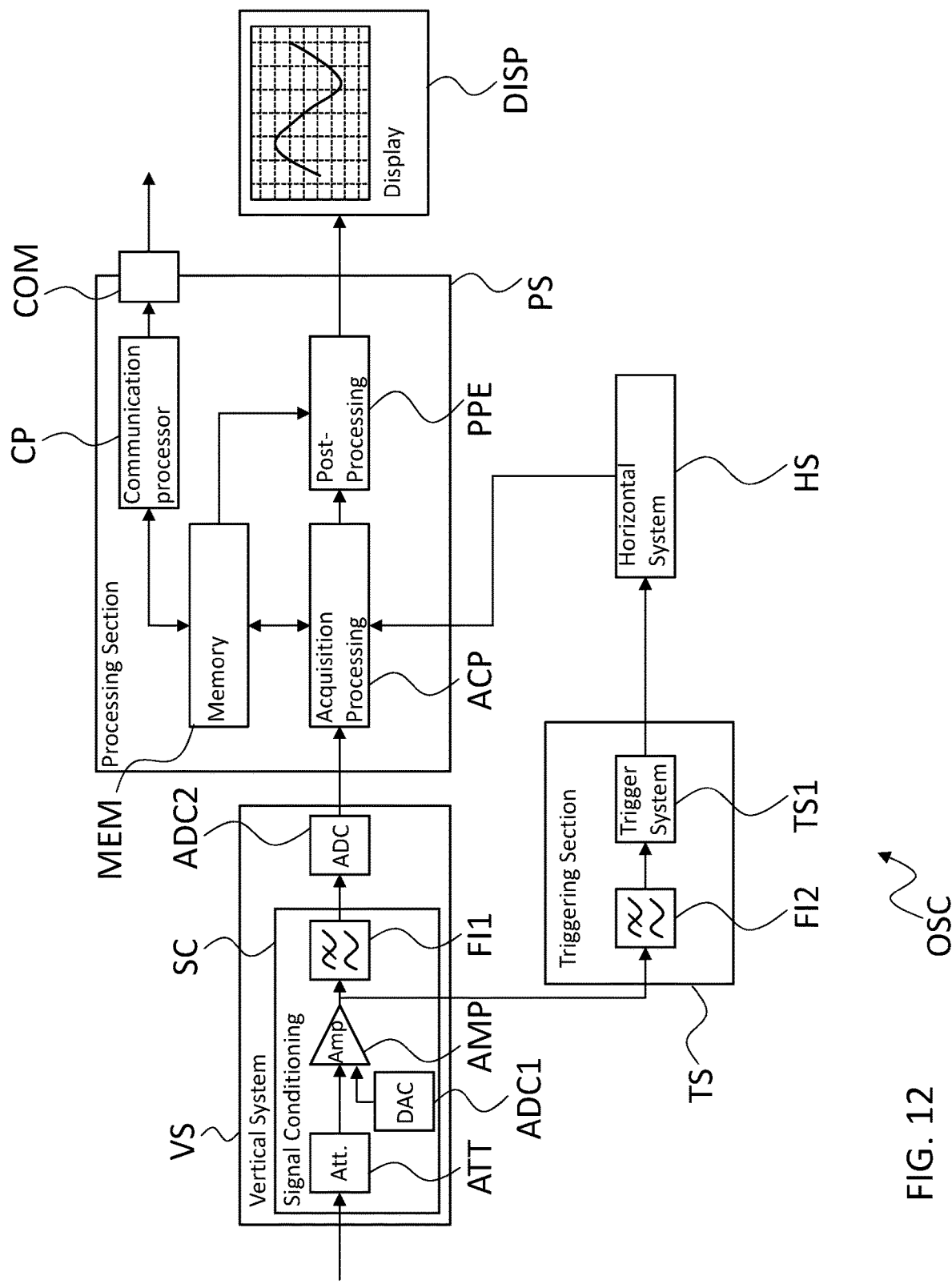
FIG. 12 shows a block diagram of another oscilloscope that may be used with an embodiment of a measurement application management device according to the present disclosure.

FIG. 12 shows a block diagram of an oscilloscope OSC that may be an implementation of a measurement application device according to the present disclosure. The oscilloscope OSC is implemented as a digital oscilloscope. However, the present disclosure may also be implemented with any other type of oscilloscope.

The oscilloscope OSC exemplarily comprises five general sections, the vertical system VS, the triggering section TS, the horizontal system HS, the processing section PS and the display DISP. It is understood, that the partitioning into five general sections is a logical partitioning and does not limit the placement and implementation of any of the elements of the oscilloscope OSC in any way.

The vertical system VS mainly serves for offsetting, attenuating and amplifying a signal to be acquired. The signal may for example be modified to fit in the available space on the display DISP or to comprise a vertical size as configured by a user.

To this end, the vertical system VS comprises a signal conditioning section SC with an attenuator ATT and a digital-to-analog-converter DAC that are coupled to an amplifier AMP1. The amplifier AMP1 is coupled to a filter FI1, which in the shown example is provided as a low pass filter. The vertical system VS also comprises an analog-to-digital converter ADC1 that receives the output from the filter FI1 and converts the received analog signal into a digital signal.

The attenuator ATT and the amplifier AMP1 serve to scale the amplitude of the signal to be acquired to match the operation range of the analog-to-digital converter ADC1. The digital-to-analog-converter DAC1 serves to modify the DC component of the input signal to be acquired to match the operation range of the analog-to-digital converter ADC1. The filter FI1 serves to filter out unwanted high frequency components of the signal to be acquired.

The triggering section TS operates on the signal as provided by the amplifier AMP. The triggering section TS comprises a filter FI2, which in this embodiment is implemented as a low pass filter. The filter FI2 is coupled to a trigger system TS1.

The triggering section TS serves to capture predefined signal events and allows the horizontal system HS to e.g., display a stable view of a repeating waveform, or to simply display waveform sections that comprise the respective signal event. It is understood, that the predefined signal event may be configured by a user via a user input of the oscilloscope OSC.

Possible predefined signal events may for example include, but are not limited to, when the signal crosses a predefined trigger threshold in a predefined direction i.e., with a rising or falling slope. Such a trigger condition is also called an edge trigger. Another trigger condition is called "glitch triggering" and triggers, when a pulse occurs in the signal to be acquired that has a width that is greater than or less than a predefined amount of time.

In order to allow an exact matching of the trigger event and the waveform that is shown on the display DISP, a common time base may be provided for the analog-to-digital converter ADC1 and the trigger system TS1.

It is understood, that although not explicitly shown, the trigger system TS1 may comprise at least one of configurable voltage comparators for setting the trigger threshold voltage, fixed voltage sources for setting the required slope, respective logic gates like e.g., a XOR gate, and FlipFlops to generate the triggering signal.

The triggering section TS is exemplarily provided as an analog trigger section. It is understood, that the oscilloscope OSC may also be provided with a digital triggering section. Such a digital triggering section will not operate on the analog signal as provided by the amplifier AMP but will operate on the digital signal as provided by the analog-to-digital converter ADC1.

A digital triggering section may comprise a processing element, like a processor, a DSP, a CPLD, an ASIC or an FPGA to implement digital algorithms that detect a valid trigger event.

The horizontal system HS is coupled to the output of the trigger system TS1 and mainly serves to position and scale the signal to be acquired horizontally on the display DISP.

The oscilloscope OSC further comprises a processing section PS that implements digital signal processing and data storage for the oscilloscope OSC. The processing section PS comprises an acquisition processing element ACP that is couple to the output of the analog-to-digital converter ADC1 and the output of the horizontal system HS as well as to a memory MEM and a post processing element PPE.

The acquisition processing element ACP manages the acquisition of digital data from the analog-to-digital converter ADC1 and the storage of the data in the memory MEM. The acquisition processing element ACP may for example comprise a processing element with a digital interface to the analog-to-digital converter ADC2 and a digital interface to the memory MEM. The processing element may for example comprise a microcontroller, a DSP, a CPLD, an ASIC or an FPGA with respective interfaces. In a microcontroller or DSP, the functionality of the acquisition processing element ACP may be implemented as computer readable instructions that are executed by a CPU. In a CPLD or FPGA the functionality of the acquisition processing element ACP may be configured in to the CPLD or FPGA opposed to software being executed by a processor.

The processing section PS further comprises a communication processor CP and a communication interface COM.

The communication processor CP may be a device that manages data transfer to and from the oscilloscope OSC. The communication interface COM for any adequate communication standard like for example, Ethernet, WIFI, Bluetooth, NFC, an infra-red communication standard, and a visible-light communication standard.

The communication processor CP is coupled to the memory MEM and may use the memory MEM to store and retrieve data.

Of course, the communication processor CP may also be coupled to any other element of the oscilloscope OSC to retrieve device data or to provide device data that is received from the management server.

The post processing element PPE may be controlled by the acquisition processing element ACP and may access the memory MEM to retrieve data that is to be displayed on the display DISP. The post processing element PPE may condition the data stored in the memory MEM such that the display DISP may show the data e.g., as waveform to a user. The post processing element PPE may also realize analysis functions like cursors, waveform measurements, histograms, or math functions.

The display DISP controls all aspects of signal representation to a user, although not explicitly shown, may comprise any component that is required to receive data to be displayed and control a display device to display the data as required.

It is understood, that even if it is not shown, the oscilloscope OSC may also comprise a user interface for a user to interact with the oscilloscope OSC. Such a user interface may comprise dedicated input elements like for example knobs and switches. At least in part the user interface may also be provided as a touch sensitive display device.

It is understood, that all elements of the oscilloscope OSC that perform digital data processing may be provided as dedicated elements. As alternative, at least some of the above-described functions may be implemented in a single hardware element, like for example a microcontroller, DSP, CPLD or FPGA. Generally, the above-describe logical functions may be implemented in any adequate hardware element of the oscilloscope OSC and not necessarily need to be partitioned into the different sections explained above.

In the oscilloscope OSC the functionality of any of the elements of the measurement application management device or the measurement application device may be implemented in any one of the processing elements, like the communication processor CP, the acquisition processing ACP, or the post processing PPE. Of course, an additional processor may be provided to implement the respective functionality.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

LIST OF REFERENCE SIGNS

100, 200, 300, 400, 500
101, 201, 301, 401, 501 measurement application management device
102, 202, 302, 402, 502 communication interface
103, 203, 303, 403, 503 measurement application device identification controller
104, 204, 304, 404, 504, 604, 704 program package retrieval controller list
804, 904 list
105-1-105-$n$, 205-1-205-$n$ program package
305-1-305-$n$, 405-1-405-$n$ program package
505-1-505-$n$, 605-1-605-$n$ program package
705-1-705-$n$, 805-1-805-$n$ program package
905-1-905-$n$, 1005-1-1005-$n$ program package
106, 206, 306, 406, 506 download controller
107 additional information
210 user interface
211 user input
315 data storage
420 access and identity management controller
421 proof of identity
530 measurement application device 640, 740, 840, 940, 1040 data source
641, 741, 841, 941, 1041 communication interface
642, 742, 842, 942, 1042 permission controller
643, 743, 843, 943, 1043
750 device registration controller
751 registration confirmation
752 device registration application
863-1-863-n data storage
970 device simulator
971 device interface
1080 device configuration memory
OSC1 oscilloscope
HO housing
MIP1, MIP2, MIP3, MIP4 measurement input
SIP signal processing
DISP1 display
OSC oscilloscope
VS vertical system
SC signal conditioning
ATT attenuator
DAC1 analog-to-digital converter
AMP1 amplifier
FI1 filter
ADC1 analog-to-digital converter
TS triggering section
AMP2 amplifier
FI2 filter
TS1 trigger system
HS horizontal system
PS processing section
ACP acquisition processing element
MEM memory
PPE post processing element
DISP display

The invention claimed is:

1. A measurement application management device comprising:
a communication interface configured to communicatively couple the measurement application management device to a data source that provides program packages for a measurement application device that is managed by the measurement application management device, wherein a permission controller configured to identify a permission state for the measurement application management device is coupled to the communication interface, wherein the permission state comprises a set of one or more access rights corresponding to a program package based on an attribute of the measurement application device or based on a specified time;
a measurement application device identification controller configured to identify the measurement application device;
a program package retrieval controller configured to retrieve a list of the program packages for the identified measurement application device and further configured to retrieve information for the program packages, the information comprising one or more of:
permission of use information, comprising one or more permission states associated with the measurement application device;
a functional description of a respective program package of the program packages in text-based language provided prior to downloading the respective program package; or
resource allocation information, comprising a threshold amount of computing resources required to download a particular program package of the program packages; and
a download controller configured to download at least one of the program packages to the identified measurement application device.

2. The measurement application management device according to claim 1,
wherein the program package retrieval controller is further configured to retrieve additional information for the program packages; and
wherein the download controller is configured to download at least one retrieved program package to the identified measurement application device in accordance with the additional information.

3. The measurement application management device according to claim 2, wherein the further additional information comprises at least one of:
hardware requirements information;
software requirements information;
license information;
pricing information;
notes for a respective program package of the program packages; or
keycodes for a respective program package of the program packages.

4. The measurement application management device according to claim 1, further comprising:
a user interface,
wherein the download controller is configured to download the at least one of the program packages to the identified measurement application device after a user confirmation received via the user interface.

5. The measurement application management device according to claim 1, further comprising:
a data storage configured to store the downloaded program packages.

6. The measurement application management device according to claim 1, further comprising:
an access and identity management controller configured to at least one of provide a proof of identity of the identified measurement application device to the data source, and manage access of the identified measurement application device to the program packages based on an identity of the identified measurement application device.

7. A measurement application device comprising:
a measurement application management device comprising:
a communication interface configured to communicatively couple the measurement application management device to a data source that provides program packages for the measurement application device that is managed by the measurement application management device, wherein a permission controller configured to identify a permission state for the measurement application management device is coupled to the communication interface, wherein the permission state comprises a set of one or more access rights corresponding to a program package based on an attribute of the measurement application device or based on a specified time;
a measurement application device identification controller configured to identify the measurement application device;

a program package retrieval controller configured to retrieve a list of the program packages for the identified measurement application device and further reconfigured to retrieve information for the program packages, the information comprising one or more of:

permission of use information, comprising one or more permission states associated with the measurement application device;

a functional description of a respective program package of the program packages in text-based language provided prior to downloading the respective program package; or resource allocation information, comprising a threshold amount of computing resources required to download a particular program package of the program packages; and a download controller configured to download at least one of the program packages to the identified measurement application device.

8. The measurement application device according to claim 7, wherein the program package retrieval controller of the measurement application management device is further configured to retrieve additional information for the program packages, and wherein the download controller of the measurement application management device is configured to download at least one retrieved program package to the identified measurement application device in accordance with the additional information.

9. The measurement application device according to claim 8, wherein the additional information comprises at least one of:

license information;
pricing information;
hardware requirements information;
release notes for a respective program package of the program packages; or keycodes for a respective program package of the program packages.

10. The measurement application device according to claim 7, further comprising:

a user interface,
wherein the download controller of the measurement application management device is configured to download the at least one of the program packages to the identified measurement application device after a user confirmation received via the user interface.

11. The measurement application device according to claim 7, further comprising:

a data storage configured to store the downloaded program packages.

12. The measurement application device according to claim 7, further comprising:

an access and identity management controller configured to at least one of provide a proof of identity of the identified measurement application device to the data source, and manage access of the identified measurement application device to the program packages based on an identity of the identified measurement application device.

13. A data source for providing program packages for at least one measurement application device, the data source comprising:

a communication interface configured to couple the data source to at least one measurement application management device; and a permission controller coupled to the communication interface and configured to identify a permission state for the at least one measurement application management device, wherein the permission state comprises a set of one or more access rights corresponding to a program package based on an attribute of an associated measurement application device or based on a specified time, provide at least one of program packages or a list of program packages for a measurement application device that is managed by a respective measurement application management device according to the identified permission state, and retrieve information for the program packages, the information comprising one or more of:

permission of use information, comprising one or more permission states associated with the measurement application device;

a functional description of a respective program package of the program packages in text-based language provided prior to downloading the respective program package: or resource allocation information, comprising a threshold amount of computing resources required to download a particular program package of the program packages.

14. The data source according to claim 13, further comprising:

a device registration controller that is coupled to the communication interface and that is configured to receive a device registration application via the communication interface, to verify the device registration application, and to output a device registration confirmation when the device registration application is verified successfully.

15. The data source according to claim 13, further comprising:

at least one data storage configured to store the program packages.

16. The data source according to claim 15, further comprising:

at least one data storage for each one of at least two specific geographical regions.

17. The data source according to claim 13, wherein the permission controller is further configured to provide additional information to the measurement application management device via the communication interface.

18. The data source according to claim 17, wherein the additional information comprises at least one of:

license information;
pricing information;
hardware requirements information;
release notes for a respective program package of the program packages; or
keycodes for a respective program package of the program packages.

19. The data source according to claim 13, further comprising:

a device simulator configured to simulate a measurement application device and to execute a program package in the simulated measurement application device.

20. The data source according to claim 13, further comprising:

a device interface coupled to the communication interface and configured to download a program package to the measurement application device via the communication interface and to control the measurement application device via the communication interface to execute the downloaded program package, and to collect feedback via the communication interface about the execution of the downloaded program package in the measurement application device.

21. The data source according to claim 13, further comprising:
a device configuration memory coupled to the communication interface and configured to store device configuration data for the at least one measurement application device that is received via the communication interface.

* * * * *